US011074595B2

(12) United States Patent
Natarajan et al.

(10) Patent No.: US 11,074,595 B2
(45) Date of Patent: Jul. 27, 2021

(54) PREDICTING BRAND PERSONALITY USING TEXTUAL CONTENT

(71) Applicant: ADOBE INC., San Jose, CA (US)

(72) Inventors: Anandhavelu Natarajan, Karnataka (IN); Niyati Himanshu Chhaya, Gokhale Road (IN); R Sundararajan, Uttar Pradesh (IN); Pradyot Prakash, Maharashtra (IN); Adarsh Kumar, Hyderabad (IN); Niloy Ganguly, West Bengal (IN)

(73) Assignee: Adobe Inc., San Jose, CA (US)

( * ) Notice: Subject to any disclaimer, the term of this patent is extended or adjusted under 35 U.S.C. 154(b) by 574 days.

(21) Appl. No.: 15/413,227

(22) Filed: Jan. 23, 2017

(65) Prior Publication Data

US 2018/0211265 A1 Jul. 26, 2018

(51) Int. Cl.
*G06Q 30/02* (2012.01)
*G06Q 10/00* (2012.01)

(52) U.S. Cl.
CPC ................ *G06Q 30/0202* (2013.01)

(58) Field of Classification Search
CPC .................................................. G06Q 30/0202
USPC ........................................................ 705/7.31
See application file for complete search history.

(56) References Cited

U.S. PATENT DOCUMENTS

| 2014/0337009 | A1* | 11/2014 | Kau ...................... G06F 40/253 |
| | | | 704/9 |
| 2016/0027064 | A1* | 1/2016 | Zazza ................ G06Q 30/0269 |
| | | | 705/14.66 |
| 2017/0017971 | A1* | 1/2017 | Moreau .............. G06Q 30/0255 |
| 2017/0046748 | A1* | 2/2017 | Zhou .................. G06Q 30/0276 |
| 2017/0060982 | A1* | 3/2017 | Akkiraju ............... G06F 16/285 |
| 2017/0061448 | A1* | 3/2017 | Akkiraju ........... G06Q 10/0637 |
| 2017/0061497 | A1* | 3/2017 | Akkiraju ................ G06Q 50/01 |
| 2017/0193533 | A1* | 7/2017 | Lai ............................ G06N 3/08 |

OTHER PUBLICATIONS

Shintaro Okazaki, "Excitement or sophistication? A preliminary exploration of online brand personality", 2006 (Year: 2006).*
Shintaro Okazaki, Excitement or sophistication? A preliminary exploration of online brand personality, International Marketing Review, vol. 23 No. 3, pp. 279-303. May 1, 2006 https://doi.org/10.1108/02651330610670451 (Year: 2006).*

(Continued)

*Primary Examiner* — Rutao Wu
*Assistant Examiner* — Abdallah A El-Hage Hassan
(74) *Attorney, Agent, or Firm* — Shook, Hardy & Bacon L.L.P.

(57) ABSTRACT

Embodiments of the present invention provide systems, methods, and computer storage media directed to facilitating predicting brand personality. In one embodiment, target content for which brand personality prediction is desired is obtained. Content features associated with the target content are identified. Such content features and a brand personality prediction model are used to predict a brand personality of the target content, the brand personality indicating personality of a brand associated with the target content.

20 Claims, 7 Drawing Sheets

(56) References Cited

OTHER PUBLICATIONS

Shintaro Okazaki, Excitement or sophistication? A preliminary exploration of online brand personality, International Marketing Review, vol. 23 No. 3, pp. 279-303. May 1, 2006 https://doi.org/10.1108/02651330610670451 (Year: 2006) (Year: 2006).*

Martin Eisend & Nicola E. Stokburger-Sauer, Brand personality: A meta-analytic review of antecedents and consequences, Published online: Feb. 27, 2013© Springer Science+Business Media New York 2013 (Year: 2013).*

Anbang Xu, Haibin Liu, Liang Gou, Rama Akkiraju, Jalal Mahmud, Vibha Sinha, Yuheng Hu, Mu Qiao, Predicting Perceived Brand Personality with Social Media, IBM Research—Almaden, San Jose, CA, USA {anbangxu, haibinliu, lgou, akkiraju, jumahmud, vibha.sinha, yuhenghu, mqiao}@us.ibm.com, 2016 (Year: 2016).*

Aaker, J. L. (1997). Dimensions of brand personality. Journal of marketing research, 34(3), 347-356.

Delin, J. (2007). Brand tone of voice. Journal of Applied Linguistics and Professional Practice, 2(1), 1-44.

Kincaid, J. P., Fishburne Jr, R. P., Rogers, R. L., & Chissom, B. S. (1975). Derivation of new readability formulas (automated readability index, fog count and flesch reading ease formula) for navy enlisted personnel.

Xu, A., Liu, H., Gou, L., Akkiraju, R., Mahmud, J., Sinha, V., . . . & Qiao, M. (Mar. 2016). Predicting perceived brand personality with social media. In Tenth International AAAI Conference on Web and Social Media.

* cited by examiner

TONE OF VOICE
- ☒ ○ Sincerity
- ☒ ○ Excitement
- ☒ ○ Competence
- ☒ ○ Sophistication
- ☒ ○ Ruggedness

[SUBMIT]

Input

*Company name*
XYZ

*Article*
A product safety overview

Our commitment to safety is both our heritage and our future. We have more than 700 in-house experts devoted globally to environmental safety, human safety and regulatory compliance of all our products and ingredients.

Keeping your family safe

Our safety standards for our products and ingredients are consistent throughout the world. We ensure our products are safe for their intended use before they even go to market - complying with all laws and regulations where they are sold.

Constant diligence

Our commitment to safety doesn't stop once our products go to market. We remain diligent in ensuring your safety by continually investigating new scientific information and collaborating with external scientists and regulatory agencies on new safety methods. We also listen to the people who use our products to confirm they are performing as expected.

Resources

Here's more information about the safety of our products and ingredients.

XYZ Product Safety Information Web Site
Safety Data Sheets
Certification Letters
Product Ingredients And here's more information about the processes we use to ensure the safety of our products and ingredients.

Human Safety Brochure
Environmental Brochure

[COMPUTE SCORES] ~304

~302

Suggestions

306

Sincerity
95.8%
0.0 0.1 0.2 0.3 0.4 0.5 0.6 0.7 0.8 0.9 1.0

Excitement
33.2%
0.0 0.1 0.2 0.3 0.4 0.5 0.6 0.7 0.8 0.9 1.0

Competence
94.1%
0.0 0.1 0.2 0.3 0.4 0.5 0.6 0.7 0.8 0.9 1.0

Sophistication
34.3%
0.0 0.1 0.2 0.3 0.4 0.5 0.6 0.7 0.8 0.9 1.0

Ruggedness
50.5%
0.0 0.1 0.2 0.3 0.4 0.5 0.6 0.7 0.8 0.9 1.0

FIG. 4

404 — Tone of Voice scores:
- Sincerity 95.8% — 0.0 0.1 0.2 0.3 0.4 0.5 0.6 0.7 0.8 0.9 1.0
- Excitement 33.2% — 0.0 0.1 0.2 0.3 0.4 0.5 0.6 0.7 0.8 0.9 1.0
- Competence 94.1% — 0.0 0.1 0.2 0.3 0.4 0.5 0.6 0.7 0.8 0.9 1.0
- Sophistication 34.3% — 0.0 0.1 0.2 0.3 0.4 0.5 0.6 0.7 0.8 0.9 1.0
- Ruggedness 50.5% — 0.0 0.1 0.2 0.3 0.4 0.5 0.6 0.7 0.8 0.9 1.0

408 — TONE OF VOICE
- ☐ ○ Sincerity
- ☐ ● Excitement
- ☐ ○ Competence
- ☐ ○ Sophistication
- ☐ ○ Ruggedness

412 SUBMIT 410

402 — Input

*Company name*
XYZ

*Article*

A product safety overview

Our commitment to safety is both our heritage and our future. We have more than 700 in-house experts devoted globally to environmental safety, human safety and regulatory compliance of all our products and ingredients.

Keeping your family safe

Our safety standards for our products and ingredients are consistent throughout the world. We ensure our products are safe for their intended use before they even go to market - complying with all laws and regulations where they are sold.

Constant diligence

Our commitment to safety doesn't stop once our products go to market. We remain diligent in ensuring your safety by continually investigating new scientific information and collaborating with external scientists and regulatory agencies on new safety methods. We also listen to the people who use our products to confirm they are performing as expected.

Resources

Here's more information about the safety of our products and ingredients.

XYZ Product Safety Information Web Site
Safety Data Sheets
Certification Letters
Product Ingredients And here's more information about the processes we use to ensure the safety of our products and ingredients.

Human Safety Brochure
Environmental Brochure

COMPUTE SCORES

406 — Suggestions

We have: We've
We: XYZ
We: XYZ
they are: they're
We remain diligent in ensuring your safety by continually investigating new scientific information and collaborating with external scientists and regulatory agencies on new safety methods.: 414
We: XYZ
We: XYZ
they are: they're
we: XYZ A product safety overview Our commitment to safety is both our heritage and our future. We have more than 700 in-house experts devoted globally to environmental safety, human safety and regulatory compliance of all our products and ingredients. Keeping your family safe Our safety standards for our products and ingredients are consistent throughout the world. We ensure our products are safe for their intended use before they even go to market - complying with all laws and regulations where they are sold. Constant diligence Our commitment to safety doesn't stop once our products go to market. [We remain diligent in ensuring your safety by continually investigating new scientific information and collaborating with external scientists and regulatory agencies on new safety methods.] 416 We remain diligent in ensuring your safety by continually investigating new scientific information and collaborating with external scientists and regulatory agencies on new safety methods. We also listen to the people who use our products to confirm they are performing as expected. Resources Here's more information about the safety of our products and ingredients. XYZ Product Safety Information Web Site Safety Data Sheets Certification Letters Product Ingredients And here's more information about the processes we use to ensure the safety of our products and ingredients. Human Safety Brochure Environmental Brochure

PREDICTING BRAND PERSONALITY USING TEXTUAL CONTENT

BACKGROUND

Organizations oftentimes desire to represent a brand using a particular personality. That is, a particular personality may be desired to be portrayed in material provided in association with a brand. For example, a fashion brand targeting high end customers may desire to evoke a personality, such as sophistication, while a hiking gear brand may desire to evoke a more rugged personality.

Content associated with a brand is typically intended to evoke a particular personality to attract and maintain customers. Accordingly, organizations generally strive to generate and publish content in a manner that is consistent with the desired personality. To maintain consistency across published content, brand entities spend a considerable amount of time preparing content intended to convey a specific personality and, thereafter, classifying such content as evoking or not evoking the desired personality. Such manual classifications can be time consuming. Further, upon identifying that content does not evoke the desired personality, the brand entity may revise the content in an effort to adjust or align the content with the desired personality thereby increasing time and effort in creating content desired for a brand.

SUMMARY

Embodiments of the present invention relate to methods, systems, and computer readable media for facilitating brand personality prediction using textual content. That is, personality of content related to a brand is predicted. To predict brand personality, embodiments of the present invention facilitate generating brand personality prediction models using training content. In particular, the training content can be analyzed to automatically identify content features associated with the content. In addition, personality annotations provided by individuals assessing the content can be obtained (e.g., a personality score ranging from one to five). Based on the content features and personality annotations, brand personality prediction models can be trained. In embodiments, a brand personality prediction model is generated for each brand personality to subsequently be assessed. For instance, a brand personality prediction model might be generated for each of sincerity, excitement, sophistication, competence, and ruggedness. Such brand personality prediction models can then be used to predict the corresponding brand personality in association with new or target content. For instance, target content can be analyzed to identify content features. The brand personality prediction models can then use the identified content features to predict various brand personalities associated with the content. By way of example only, an article may be identified as having a strong competence personality, but a weak excitement personality.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 4 is a user display interface illustrating content modification suggestions according to an example embodiment;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Although more details regarding various terms are provided throughout this description, general definitions of some terms are included below to provider a clearer understanding of the ideas disclosed herein:

Content generally refers to any electronic content, such as electronic articles or other documents (e.g., webpages), including text. Training content refers to content that is analyzed and used to train a brand personality prediction model(s). Target content refers to content for which brand personality is to be predicted.

Content features refer to any features or aspects associated with, or indicating, content, such as textual content. A content feature might be represented by a word or phrase (keyword) that describes, characterizes, or indicates an aspect of the content. As another example, a content feature might be represented by a numeral value or other value indicating a presence or absence of a feature or word. As yet another example, a content feature may be represented by a count or frequency of a feature or word. Content features may include, but are not limited to, term features, affect-based features, and linguistic features.

Brand personality generally refers to a set of human characteristics that are attributed to a brand or brand name.

Brand personalities may include, but are not limited to, excitement, sincerity, ruggedness, competence, and sophistication.

A brand personality prediction model refers to a model that predicts brand personality for content.

Personality annotations refer to annotations or labels that indicate an extent in which a personality is conveyed in content, such as training content.

A brand generally refers to a feature that distinguishes one product, service, and/or entity from others. As described, brand personality generally refers to a set of human characteristics that are attributed to a brand name. Typically, an effective brand personality increases the brand's equity by having a consistent set of traits that a specific consumer segment appreciates. For example, a soap company may select sincerity as its brand personality for various soap products to allow the company to attract female consumers. Brand personalities can be of any type. By way of example only, brand personalities may include excitement, sincerity, ruggedness, competence, and sophistication. Excitement generally relates to a carefree, spirited and youthful attitude. Sincerity generally relates to a feeling of kindness, thoughtfulness, and an orientation toward family values. Ruggedness generally relates to rough, tough, outdoorsy and athletic. Competence generally relates to being successful, accomplished and influential. Sophistication is generally related to elegance and prestigious.

To maintain consistency across published content, brand entities typically prepare content with a targeted personality in mind (e.g., sophistication). Because the content may not convey the desired personality intended, in conventional implementations, brand entities spend a considerable amount of time classifying the created content to assess whether the content does indeed express the desired personality. Manually classifying content, however, can be tedious and time consuming. Moreover, in the event the content is determined not to evoke a desired personality, the brand entity may revise the content in an effort to further align the content with the desired personality. Upon providing such revisions, the content can again be classified to determine whether the desired personality is achieved. Such a process can iterate until the brand entity achieves the desired personality being evoked from the content, resulting in a time consuming process being performed for each created content.

Embodiments of the present invention relate to methods, systems, and computer readable media for facilitating automatic prediction of brand personality. In this regard, a user may simply provide content and, in response, obtain a prediction or set of predictions related to the brand personality of the content. By way of example only, upon inputting content, a user may be provided with a predicted measure of various brand personalities, such as sophistication, sincerity, excitement, competence, and/or ruggedness. To predict such brand personalities, the content can be analyzed to identify content features associated with the content. Content features may include various features used to predict brand personality, such as term features, affect-based features, and linguistic features. The identified content features can be used in association with one or more brand personality prediction models to predict corresponding brand personalities. For instance, one brand personality prediction model can be used to predict excitement and another brand personality prediction model can be used to predict competence.

Brand personality prediction models can be generated using training content. In particular, training content can be analyzed to identify content features, such as term features, affect-based features, and linguistic features. The content can also be analyzed by individuals, referred to herein as annotators, that view the content and provide annotations, or feedback, as to perceived personality evoked from the content. The content features and provided annotations can then be used to generated brand personality prediction models. Utilizing such brand personality prediction models enables automated and efficient brand personality prediction.

Figure 1:
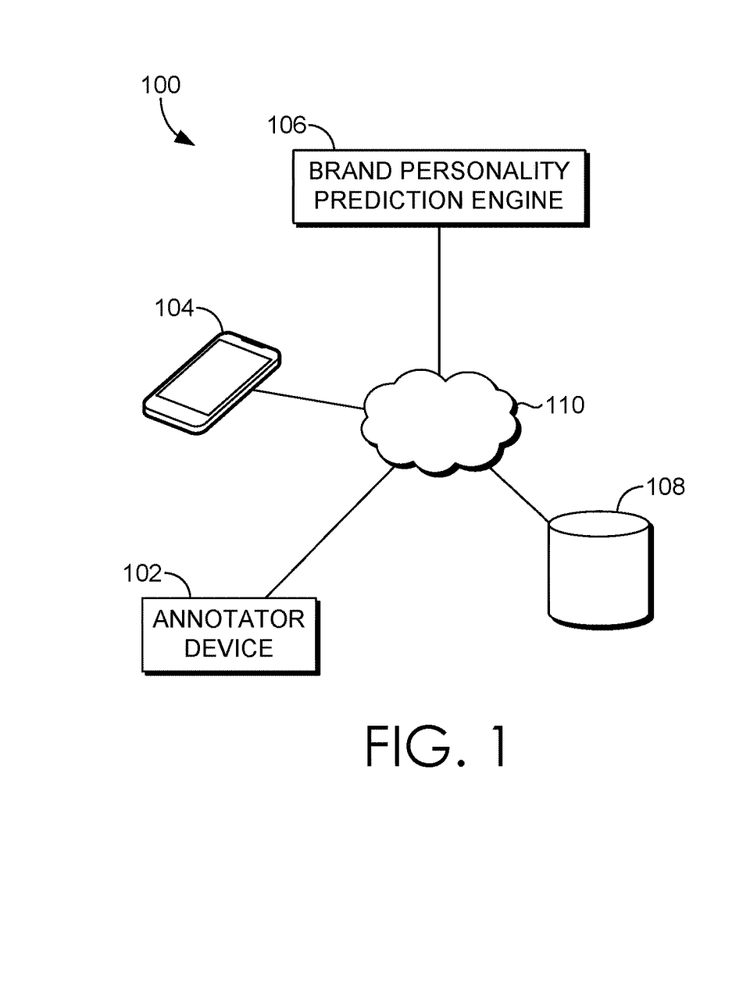
FIG. 1 is a schematic depiction of a system for facilitating brand personality prediction, in accordance with embodiments of the present invention.

Turning now to FIG. 1, a schematic depiction is provided illustrating an exemplary system 100 in which some embodiments of the present invention may be employed. Among other components not shown, the environment 100 may include annotator device 102, user device 104, brand personality prediction engine 106, and a data store 108. It should be understood that the system 100 shown in FIG. 1 is an example of one suitable computing system. Any of the components shown in FIG. 1 may be implemented via any type of computing device, such as computing device 800 described with reference to FIG. 8, for example. The components may communicate with each other via one or more networks 110, which may include, without limitation, one or more local area networks (LANs) and/or wide area networks (WANs). Such networking environments are commonplace in offices, enterprise-wide computer networks, intranets, and the Internet.

It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Generally, system 100 facilitates predicting brand personality based on content, such as textual content. As described, brand personality refers to a personality evoked by content, such as textual content, associated with a brand or brand name. Brand personality can evoke various personalities, such as, for example, sincerity, excitement, sophistication, competence, and ruggedness. Such personalities may be referred to herein as brand personalities or dimensions of brand personalities (or personality dimensions).

At a high level, to predict brand personality conveyed by content, textual content is analyzed to identify or detect various content features. Based on the content features, a brand personality prediction model can be generated for each brand personality dimension. For example, a brand personality prediction model can be generated for each of sincerity, excitement, sophistication, competence, and ruggedness personalities. The brand personality prediction models can then be used to assess target content, or new content (e.g., a new article), to predict brand personality associated with such content. In this regard, a prediction of an extent or measure of each brand personality dimension might be determined. Accordingly, a user, such as a marketer, can be provided with predicted brand personalities associated with the content. Further, various recommendations or suggestions can be provided in an effort to achieve or attain a target brand personality measure. In this way, suggestions may be provided to modify text resulting in a decreased or an increased level of sincerity, excitement, competence, sophistication, and/or ruggedness.

By way of example, and with brief reference to FIG. 4, assume a user, such as a marketer, inputs textual content 402 for brand personality prediction. In such a case, an extent of brand personality for various brand personality dimensions can be provided to reflect brand personality associated with the content. As shown in FIG. 4, various brand personality measures 404 associated with the textual content 402 are provided. The user (e.g., marketer) can utilize such information to understand the personality portrayed by the content 402, or how an audience might perceive the brand personality of the content 402. Further, various suggestions 406 can be provided to recommend or suggest a manner(s) in which to modify the text to provide a varied level of brand personality. By way of example only, various suggestions may be provided to increase the excitement reflected in the text.

Returning to FIG. 1, in operation, the annotator device 102 and user device 104 can access the brand personality prediction engine 106 over a network 110 (e.g., a LAN or the Internet). For instance, the annotator device 102 and user device 104 may provide and/or receive data from the brand personality prediction engine 106 via the network 110. Network 110 may include multiple networks, or a network of networks, but is shown in simple form so as not to obscure aspects of the present disclosure. By way of example, network 110 can include one or more wide area networks (WANs), one or more local area networks (LANs), one or more public networks, such as the Internet, and/or one or more private networks. Networking environments are commonplace in offices, enterprise-wide computer networks, intranets, and the Internet. Accordingly, network 110 is not described in significant detail.

An annotator device, such as annotator device 102, may be any computing device that is capable of presenting content to an annotator, for example, via a web browser or application installed thereon. In particular, and in accordance with embodiments described herein, annotator device 102 presents training content to annotators to obtain brand personality annotations or labels associated with training content. Training content refers to textual content that is analyzed and used to train a brand personality prediction model(s). In response to viewing training content at the annotator device 102, an annotator can provide annotations or labels associated with the content to indicate brand personality perceived from the content.

Brand personality annotations or labels can be provided in any manner (e.g., annotator selection or input). Further, an annotator may provide brand personality annotations for any number of brand personality dimensions. By way of example only, an annotator may select or input a brand personality label for each of sincerity, excitement, competence, sophistication, and ruggedness personality dimensions. A brand personality annotation can be denoted in any number of ways, such as, for example, utilization of text (e.g., label with the personality dimension, such as "sincerity"), a personality score (e.g., a score between 1 to 5 for a personality dimension), a personality level (e.g., a high/ medium/low level of a particular personality dimension), or the like.

The annotator device 102 may be operated by any user that annotates brand personality in association with various content. While only one annotator device 102 is illustrated in FIG. 1, multiple annotator devices associated with any number of annotators may be utilized to carry out embodiments described herein. The annotator device 102 may take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. Further, the annotator device 102 may include one or more processors, and one or more computer-readable media. The computer-readable media may include computer-readable instructions executable by the one or more processors.

A user device, such as user device 104, may be any computing device that is capable of facilitating a user to provide content that may be analyzed to identify or predict brand personality associated with the content. For example, a user may provide content to the brand personality prediction engine 106 via a browser or application installed on the user device 104. The user device 104 may be used to provide training content and/or target content. Training content is content used to train a brand personality prediction model. Target content is content for which brand personality prediction is desired. Further, any type of user interface may be used to provide such content. In some cases, a user may input the content, for example, by typing or copying/pasting content. In other cases, content may be input by providing or inputting a reference to such content (e.g., a link, a URL, or pointer to content).

In some cases, the user device 104 accesses the brand personality prediction engine 106 via a web browser, terminal, or standalone PC application operable on the user device. User device 104 might be operated by an administrator, which may be an individual(s) that manages marketing associated with a brand, a product, a website, an application, or the like. For instance, a user may be any individual, such as a marketer, associated with an entity publishing the content (e.g., via the Internet). While only one user device 104 is illustrated in FIG. 1, multiple user devices associated with any number of users may be utilized to carry out embodiments described herein. The user device 104 may take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. Further, the user device 104 may include one or more processors, and one or more computer-readable media. The computer-readable media may include computer-readable instructions executable by the one or more processors.

The data store 108 includes data used to facilitate brand personality prediction. As described in more detail below, the data store 108 may include content data, such as textual content and/or metadata associated therewith, and/or content feature data. The data store 108 may also include personality data, such as brand personality annotations. Such content data, content feature data, and personality data may be stored in the data store 108 and accessible to any component of the system 100. The data may also be updated at any time. In embodiments, the personality data, or portion thereof, is updated dynamically or, in real-time, as an annotator reviews additional training content or at any point when data changes.

The brand personality prediction engine 106 is generally configured to predict brand personality associated with content. At a high-level, the brand personality prediction engine 106 generates brand personality prediction models using training content. In particular, the brand personality prediction engine 106 can obtain and analyze training content to generate one or more brand personality prediction models. In embodiments, a brand personality prediction model is generated for each personality dimension. The brand personality prediction model(s) can then be utilized to predict brand personality in association with target content. Predicted brand personality can be provided to a user, such as a marketer.

Figure 2:
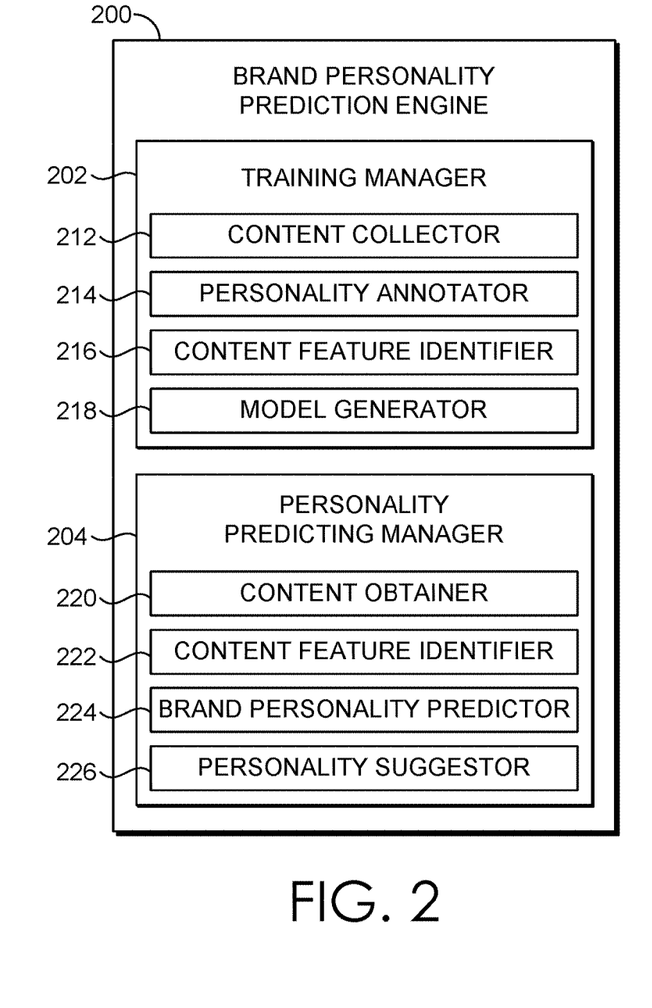
FIG. 2 is a depiction of a brand personality prediction engine, in accordance with embodiments of the present invention.

An exemplary brand personality prediction engine is provided in FIG. 2. As shown in FIG. 2, a brand personality prediction engine 200 includes a training manager 202 and a personality predicting manager 204. The training manager 202 generally facilitates training a brand personality predicting model(s), and the personality predictor 204 utilizes the brand personality predicting model(s) to predict brand personality. Although illustrated as separate components of the brand personality prediction engine 200, any number of components can be used to perform the functionality described herein. Further, although illustrated as being a part of a brand personality prediction engine, the components can be distributed via any number of devices. For example, a training manager can be provided via one device, server, or cluster of servers, while the personality predicting manager can be provided via another device, server, or cluster of servers. The components identified herein are merely set out as examples to simplify or clarify the discussion of functionality. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more components may be carried out by hardware, firmware, and/or software. For instance, various functions may be carried out by a processor executing instructions stored in memory.

As described, the training manager 202 is generally configured to train brand personality prediction models. A training manager 202 may include a content collector 212, a personality annotator 214, a content feature identifier 216, and a model generator 218. Although illustrated as separate components of the training manager 202, any number of components can be used to perform the functionality described herein.

The content collector 212 is configured to collect or obtain content. In particular, the content collector 110 collects training content. As described, training content refers to content, typically textual content, from which prediction models are trained. In embodiments, training content is not exclusive to target content in that target content can also be used as training content.

Content can be collected or obtained in any manner. In some cases, training content is provided by a user of the brand personality prediction engine, such as a marketer. In this regard, a marketer might enter or input content, for example, via a website accessible by way of a browser or an application. As an example, a marketer might enter or select content via user device 104 of FIG. 1 that is connected to the network 110. For instance, a marketer might select or provide content, for example, from a document or a webpage.

Additionally or alternatively, a web crawler may be used to collect content, such as articles from websites or web pages. In this regard, the content collector 212 can crawl, or utilize a web crawler to crawl, various sources to identify training content that can be used in training brand personality prediction models. The identified content can be stored, for example, in a data store (e.g., data store 108 of FIG. 1).

The personality annotator 214 is configured to collect personality annotations associated with brand personalities. The personality annotator 214 can collect personality annotations in association with each personality dimension for various training content. In some cases, human annotators can be used to label or annotate training content via annotator devices, such as annotator device 102 of FIG. 1. In this regard, annotators may rate or score the brand personality of given content or documents. For example, an annotator can score a particular personality for a training content based on a scale, such as a scale of 1 to 5. A scale, such as a scale of 1 to 5, can be used by an annotator to score each personality dimension, or set of personality dimensions. For example, a score of "5" can indicate that the particular brand personality is strongly present in the content, while a score of "1" can indicate that the brand personality is weak or absent from the content. The personality annotations obtained or collected by the personality annotator 214 can be used as ground truth data.

The content feature identifier 216 is generally configured to identify content features associated with content. In this regard, upon obtaining or referencing content, such as collected training content, the content may be analyzed to detect content features. For example, a webpage or electronic document including content can be analyzed to detect content features associated with the content.

A content feature refers to any feature or aspect associated with, or indicating, content, such as textual content. A content feature might be represented by a word or phrase (keyword) that describes, characterizes, or indicates an aspect of the content. For example, a content feature may refer to a term or phrase, sometimes referred to as a keyword, that corresponds with content. As another example, a content feature might be represented by a numeral value or other value indicating a presence or absence of a feature or word. As yet another example, a content feature may be represented by a count or frequency of a feature or word. Content features may include, but are not limited to, term features, affect-based features, and linguistic features. As can be appreciated, any type of features indicating content text can be used herein.

Term features generally refer to features identified in association with term usage (e.g., word or phrase usage). In embodiments, term features are identified following a bag of words approach in which text is transformed into a set of words or n-grams, or "bag of words." Based on the "bag of words," various measures can be applied to characterize the text, such as, for instance, statistics of occurrence of words or n-grams used. In accordance with some embodiments of the present invention, term features may include term frequency features and positive-negative term features.

A term frequency feature is generally used to capture data about important and/or popular terms used in content. In embodiments, term frequency features can be represented using term frequency, or term frequency-inverse document frequency (TFIDF). In some cases, the content may be passed through a term frequency tagger one or more times to determine such frequencies. For example, content may be passed through a term frequency tagger to determine the term frequency of every term in the content. If a term has greater than 0 term frequency, it signifies that the term is mentioned in the content. Further, a higher term frequency indicates a higher number of times it is mentioned in the content. In some cases, stop words, that is words or terms programmed to be ignored or excluded, may be removed prior to computing a term frequency vector (e.g., TFIDF) vector.

Positive-negative term features can also be identified in association with content. Positive terms generally indicate terms that positively describe a class, whereas negative terms are likely contributed to a negative description of a class. To identify positive and/or negative term features, content can be analyzed to identify a count of each positive term and a count of each negative term. In some cases, a set of positive terms and a set of negative terms can be determined and, thereafter, used to identify corresponding frequency counts in content. In this regard, for instance, a list of top 100 positive words and a list of top 100 negative words can be selected, and the count or frequency of each of the words in the content can be used as a feature. When content is analyzed, the text content can be input and a positive and negative count can be output. The positive count may equal the sum of number of occurrences in the content of each word in the positive list, and the negative count may equal the sum of number of occurrences in the content of each word in the negative list.

Any method may be used to generate lists of positive and negative words. By way of example only, a corpus of documents along with positive and negative tags can be input or identified. Based on the input, a list of positive words and a list of negative words can be output. For instance, the corpus can be divided into positive and negative classes. For each word, or n-gram in the corpus, the frequency of the word among the documents in the positive class and the negative class can be identified. For instance, a positive list of the top 100 most frequent words in the positive set of documents can be identified, and a negative list of the top 100 most frequent words in the negative set of documents can be identified.

Affect features generally refer to features that denote the emotion, or affect, content presents. Affect features can be identified in any number of ways. One exemplary method to use in identifying affect features utilizes Linguistic Inquiry and Word Count (LIWC). LIWC is a psycholinguistic dictionary that provides affect words and can be used to form a set or vector of affect features. Using LIWC can assist in identifying information about the text that is contributing to the emotion or the affects in the audience. In embodiments, the count of words for each, or a set, of the affect terms or dimensions provided by LIWC can be used to form a vector of affect features.

Linguistic features generally refer to linguistic elements of text that affect how brand personality is evoked by the text. Various linguistic features include chains of reference, collocations, contractions, and readability. Chains of reference refer to a set of connections between a noun phrase in text and a brand concept or term. Chains or reference generally examine a manner in which references to the brand and associated elements are made within the content. Chains of reference may be of various types, such as, for instance, repetitions, partial repetitions, co-references, and possessive inferrables. Repetitions may refer to repetitions or repeating a reference (e.g., full reference) to the brand. For example, repetitive full repetitions of the brand can strongly evoke the brand. A partial repetition can include a phrase that includes a reference to the brand, but refers to something other than the brand concept. Co-references can refer to a concept that is reinforced by repetition, or referring to it again, but the full description is not used. Possessive inferrables can refer to a link created by referring to something that the brand had, does, or has given to a customer, using a positive noun phrase.

In one embodiment, content and a list or set of brand names (or terms) can be analyzed such that a count of occurrences for repetitions, partial repetitions, co-references and possessive inferrables are output. To analyze the content, the text can be converted into a sequence of tokens, for example, by passing the text through a tokenizer. Each token can be tagged with a part of speech using a part of speech (POS) tagger. Part of speech tagging can be applied to classify words into a part-of-speech and labeling the word accordingly (e.g., noun, proper noun, verb, adjective, pronoun, article, etc.).

Such tagged tokens can be used to identify repetitions, partial repetitions, co-references, and possessive inferrables. For instance, partial repetitions may be identified when a token is present in a list of brand names (or terms), the token is not the last word in the sentence, and the POS tag associated with the next token in the text is a noun phrase (NNP) or a noun phrase plural (NNPS). In such a case, the partial repetition count can be incremented by one. Repetitions may be identified when a token is present in a list of brand names (or terms), but the token is the last word in the sentence or the POS tag associated with the next token in the text is not a noun phrase (NNP) or a noun phrase plural (NNPS). In such a case, the repetition count can be incremented by one. Co-references can be identified when the token is present in a list of first person personal pronouns and any token in a previous number (e.g., 3) of sentences is present in a list of brand names. In such a case, the co-reference count can be incremented by one. Possessive inferrables can be identified when a token is present in a list of possessive pronouns, the token is not the last word in the sentence, and a POS tag associated with the next token in the text is a noun phrase (NNP) or a noun phrase plural (NNPS). In such a case, the possessive inferrables count can be incremented by one. The repetition count, partial repetition count, co-reference and possessive inferable counts can be output.

Upon determining the various chains of reference counts, such counts can be included in a feature vector. In this regard, a feature vector can include the counts of each of the types of chain of reference. The chains of reference feature can help increase or decrease the strength of a brand personality that is evoked. For instance, repetitively using a brand name helps strongly evoke a brand, and using a general inferable can reduce brand personality evoked. To this end, if text (e.g., a paragraph) evokes a personality type that is desired to be modified, the presence of the chain of reference can be modified.

A collocations feature is generally used to capture commonly occurring word sequences in a language (e.g., English). Phrases commonly used in association with a brand can contribute to the brand personality. As such, a frequency or count of collocations within content can be identified as a feature(s). To identify a collocation feature(s) in content, such as training content, each n-gram (e.g., bi-gram) in the text can be looked up in a list of collocations, and the number of collocations in the document can be counted. A list or set of collocations for use in identifying collocations in content can be identified in any manner. For instance, a marketer of a brand may provide a list of collocations. Alternatively, a set of collocations can be automatically identified based on identification of frequently or commonly (e.g., exceeding a threshold) occurring word sequences in content associated with a particular brand.

A contractions feature refers to a feature indicating whether a contraction(s) exists. As such, contraction features indicate the presence or absence of contractions in the content. A contraction refers to a shortened version of written or spoken forms of a word, syllable, or word group. The use of contractions in content generally adds casualness to the text. As such, contraction features can play an important role for modifying various personality dimensions, such as sophistication, ruggedness, and sincerity. To identify contraction features, each word in content can be compared to a list of contractions to identify contraction usage. The number of contractions in the content can be counted.

Readability features quantify the coherence (e.g., logic or consistency) in the content. As such, readability can be based on the quantity of words, sentences, and syllables in text. One method that may be used to identify readability features utilizes the Flesh Kincaid Readability Score. The Flesch Kincaid readability scores are readability scores that indicate how difficult a text is to understand. A readability score can be determined using the formula: 206.835−1.015 (total words/total sentences)−84.6 (total syllables/total words). Readability of a text can affect various personality dimensions, such as the sophistication and sincerity dimensions of the content. For example, more readable text can be considered less sophisticated. As can be appreciated, alternative readability methods may be employed to determine or identify readability features associated with content.

Any number of methods can be used to identify or collect content features. The above methods are only provided as examples of possible implementations that may be employed in accordance with embodiments of the present invention. Further, as can be appreciated, any number of content features may be obtained. In some cases, data deemed relevant or beyond a threshold or relevancy might be selected, for example, such as most valuable or important features. Further, obtaining content data might happen at any time. For instance, in some cases, content data associated with content might be obtained on a single occasion or updated as provided by a marketer or analysis.

The model generator 218 is generally configured to generate brand personality prediction models. As described, the model generator 218 can generate a brand personality prediction model corresponding with each brand personality dimension, such as, for instance sincerity, excitement, competence, sophistication, and ruggedness. The model generator 218 can utilize identified content features and personality annotations associated with content to generate such brand personality prediction models. To this end, upon obtaining content features and personality annotations, a model can be generated for each personality dimension.

In some cases, a feature vector may be generated using the identified features. A feature vector can be computed as a concatenation of the identified features or corresponding feature vectors described above. In some cases, all identified features can be used to generate a feature vector or feature set. In other cases, features can be selected for use in generating brand prediction models. For instance, a set of features for each of the dimensions can be selected based on the predicted relevancy or accuracy.

In embodiments, the obtained personality annotations may be aggregated or otherwise used to compute ground truth data for use in generating brand personality prediction models. By way of example only, assume that various annotators provide personality annotations for each personality dimension associated with a document. In such a case, for each personality dimension, the corresponding personality annotations from the various annotators can be averaged or aggregated to arrive at a personality score for each personality.

Using the features (e.g., feature vector) and personality annotations for a particular personality dimension (e.g., personality scores for the personality dimension), a brand personality prediction model can be learned or generated for the particular personality dimension. In some embodiments, a dependent variable, or classification (e.g., positive or negative for a personality dimension), can be determined using a mean of the personality scores given by annotators for a particular content in association with a particular personality dimension. The direction, or sign, of the variable can be derived based on the mean. For example, a set of mean scores can designate a positive variable, while another set of mean scores can designate a negative variable. For instance, using a score scale of one to five, if the mean is less than three, the variable can be termed negative (e.g., a negative classification for a personality). Alternatively, if the mean is three or greater, the variable can be termed positive (e.g., a positive classification for the personality).

The direction (sign) of the variable and the feature set (e.g., feature vector) can be provided to a classifier as a training example. A training example may include alternative or additional information. For instance, in some implementations, a training example may include the feature set (e.g., feature vector) and the personality score. A classifier may be in any form. As one example, a classifier may be a supervised learning algorithm (SVM). Utilizing a set of training examples, the classifier can then learn or train a brand personality prediction model for a particular personality dimension. Brand personality prediction models can be generated in a similar manner for each personality dimension. As such, in embodiments, brand personality prediction models can be generated for sincerity, excitement, competence, sophistication, and ruggedness personality dimensions.

As described, the personality predicting manager 204 is generally configured to predict brand personality for content, such as target content. A personality predicting manager 204 may include a content obtainer 220, a content feature identifier 222, a brand personality predictor 224, and a personality suggestor 226. Although illustrated as separate components of the personality predicting manager 204, any number of components can be used to perform the functionality described herein.

The content obtainer 220 is configured to obtain content, such as target content, for brand personality prediction. In this regard, content is obtained for which a prediction of brand personality is desired. Content can be collected or obtained in any manner. In some cases, target content is provided by a user of the brand personality prediction engine, such as a marketer. In this regard, a marketer might enter or input content, for example, via a website accessible by way of a browser or an application on marketer device 104. As an example, a marketer might enter or select content via user device 104 of FIG. 1 that is connected to the network 110. For instance, a marketer might select or copy content, for example, from a document or a webpage for which brand personality prediction is desired. The content can then be pasted or input to a website or application associated with brand personality prediction.

The content feature identifier 222 is configured to identify content features associated with the content, such as target content. The content can be analyzed to obtain content features. For example, the content feature identifier 222 can be used to identify content features within the target content such as, for instance, term features, affect features, and linguistic features.

Content features can be identified in target content in the same or similar manner as described above with respect to the content feature identifier 216 generally described as identifying content features from training content. As such, various methods used to identify content features are not described again here. It should be noted that although described as separate components, a single component can be used to identify content features for both training content and target content. The components are only shown separately herein for explanatory purposes.

The brand personality predictor 224 is configured to predict brand personality in association with the content. To predict a level or measure of brand personality associated with a particular personality dimension, the respective trained brand personality prediction model can be used. In particular, the brand personality predictor 224 can utilize content features identified in association with the target content and a brand personality prediction model to predict a brand personality measure for a particular personality dimension. A brand personality prediction can be represented in any number of ways. For example, a brand personality prediction may be represented using text (e.g., strong/weak personality, high/medium/low personality, identification of a most prevalent personality dimension, etc.), using numerals (e.g., on a scale of 1 to 5, as a ratio, as a percent (e.g., scaling a score of 1 to 5 to 1 to 100 to provide a percent score, etc.).

The brand personality predictor 224 can provide or output brand personality predictions. In this regard, in response to receiving a request for a brand personality prediction, the brand personality predictor 224 can provide one or more brand personality predictions, for example, to a user device requesting the prediction(s). In some cases, a prediction, or measure, may be provided for each personality dimension. In other cases, a prediction, or measure, for a particular set of personality dimensions may be provided. For instance, a personality dimension most prevalent in the content may be provided as the brand personality prediction. As another example, a measure or extent of brand personality for a most prevalent brand personality in the content may be provided.

The personality suggestor 226 can provide suggestions to modify the content in association with a particular brand personality. A suggestion or set of suggestions for modifying content may be based on the particular brand personality associated with the suggestion(s). In some cases, suggestions may be automatically provided along with brand personality predictions. In other cases, suggestions may be provided based on a user request. As one example, a user may request modification suggestions for any personality dimensions or for a particular personality dimension(s). Further, in some cases, a user may provide an indication of an extent for which modification suggestions are desired. By way of example only, a user may select a particular personality dimension (e.g., sophistication) and select to increase or decrease the amount of personality conveyed in the content. Using the example of the sophistication personality dimension, if a user selects to increase the amount of sophistication conveyed in the content, suggestions to modify the content can correspond with content modifications that increase the sophistication personality within the content (e.g., suggestions to remove contractions in the text). On the other hand, if a user selects to decrease the amount of sophistication conveyed in the content, suggestions to modify the content can correspond with content modifications that decrease the sophistication personality with the content (e.g., suggestions to add contractions in the text).

Figure 3:
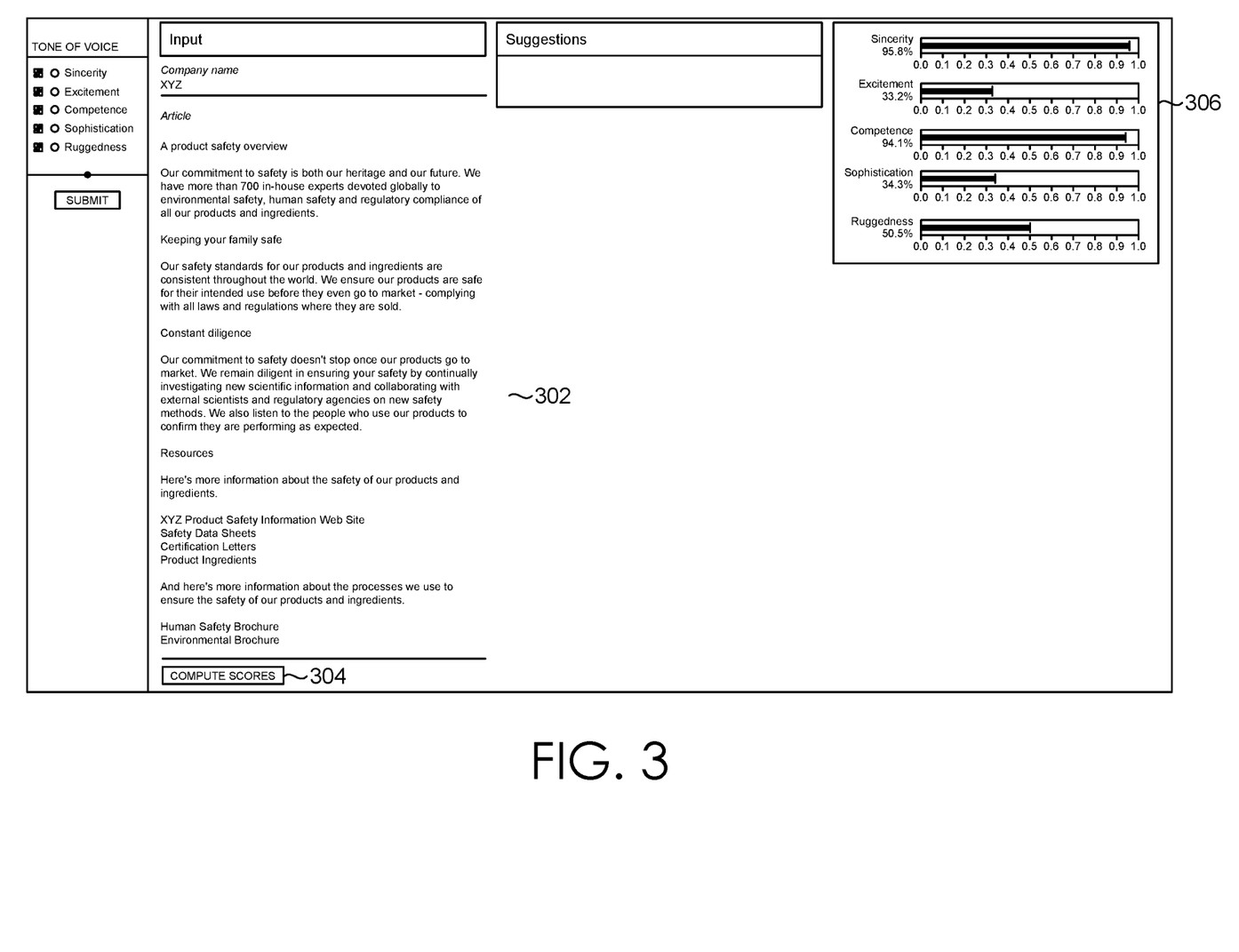
FIG. 3 is a user interface display showing input content and corresponding brand personality predictions, in accordance with embodiments of the present invention.

By way of example only, and with reference to FIGS. 3 and 4, user interfaces are provided in which a user can provide content and view brand personality predictions and modification suggestions. As shown in FIG. 3, a user may input target content 302. In embodiments, a user inputting the target content 302 may be an individual, such as a marketer, associated with a company brand. Upon inputting the target content 302, assume a user selects to compute scores 304. In such a case, a set of brand personality predictions 306 are presented. As shown in FIG. 3, "sincerity" has a brand personality prediction of 95.8%, "excitement" has a brand personality prediction of 33.2%, "competence" has a brand personality prediction of 94.1%, "sophistication" has a brand personality prediction of 34.3%, and "ruggedness" has a brand personality prediction of 50.5%. As such, a user can recognize that the target content 302 conveys a high degree of sincerity and competence, and a moderate amount of excitement, sophistication, and ruggedness.

Now assume that to maintain a consistent reflection of the brand associated with the target content 302, the user desires to increase the level of excitement expressed in the target content 302. In such a case, as shown in FIG. 4, the user can select the brand personality "excitement" 408 to obtain suggestions related to the excitement personality dimension. Further, the user can select to increase the extent or level of excitement conveyed in the content. As one example, and as shown in FIG. 4, the user can use the slider 410 to indicate a desire to increase the level of excitement (e.g., by moving the slider to the right or in a positive direction). Upon selecting submit 412, a set of corresponding suggestions 406 can be provided. As shown in the set of suggestions 406, various suggestions to increase excitement include utilization of contractions and replacement of pronouns (e.g., we) with a brand (e.g., XYZ). In some cases, by selecting on a particular suggestion, such as suggestion 414, the corresponding aspect of input text can be highlighted or emphasized, as shown by emphasis 416.

Figure 5:
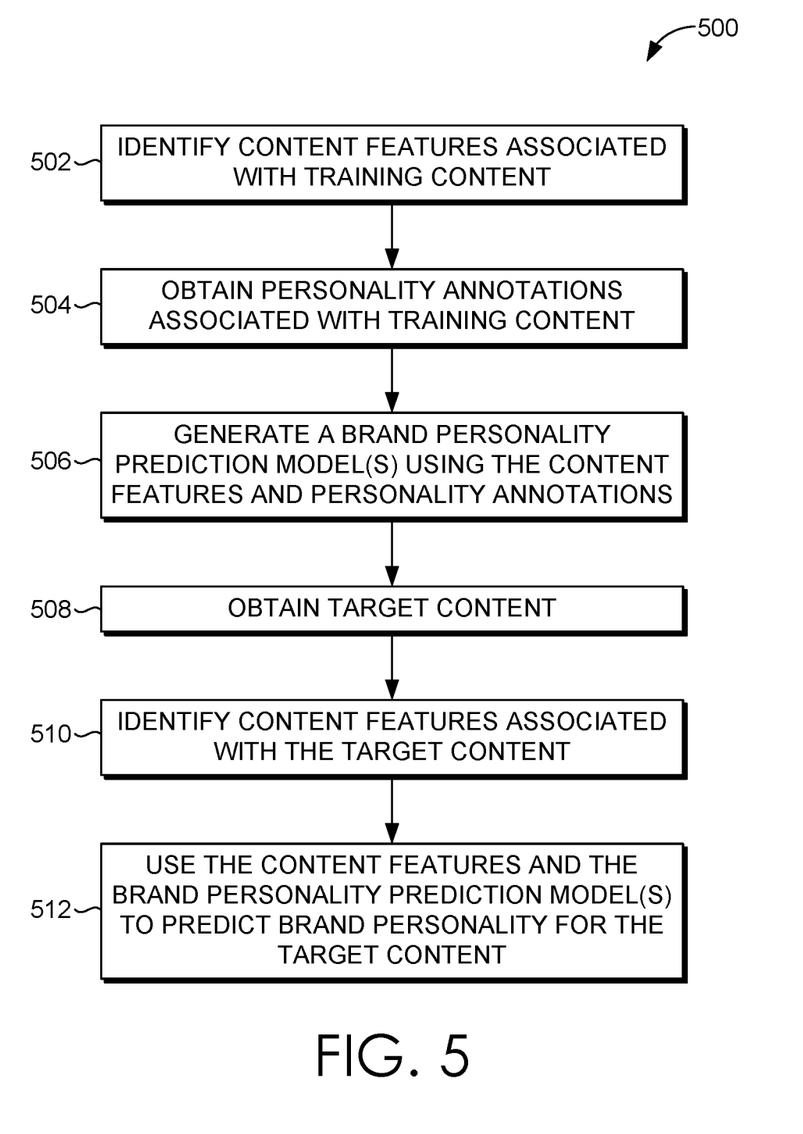
FIG. 5 is a flow diagram showing a method for facilitating brand personality prediction, in accordance with an embodiment of the present invention.

Turning now to FIG. 5, a flow chart is illustrated showing an exemplary method 500 of predicting brand personality, in accordance with embodiments of the present invention. In embodiments, the method 500 is performed by a brand personality prediction engine, such as brand personality prediction engine 200 of FIG. 2. Initially, and as indicated at block 502, content features associated with training content are identified. Content features may include any number of features associated with or indicating the content. Content features may include, for example, term features, affect features, and/or linguistic features. At block 504, personality annotations associated with training content are obtained. Such personality annotations can include an indication or extent for which a personality is conveyed in the content (e.g., as provided by a user). Thereafter, at block 506, the content features and personality annotations are used to generate a brand personality prediction model(s). Such brand personality prediction models can be generated for a variety of personality dimensions, such as, for example, sincerity, excitement, competence, sophistication, and/or ruggedness. At block 508, a target content is obtained. Such a target content can be provided by any user, such as a marketer of a brand associated with or relevant to the target content. At block 510, the content features associated with the target content are identified. The content features and the brand personality prediction model(s) are used to predict brand personality for the target content, as indicated at block 512.

Figure 6:
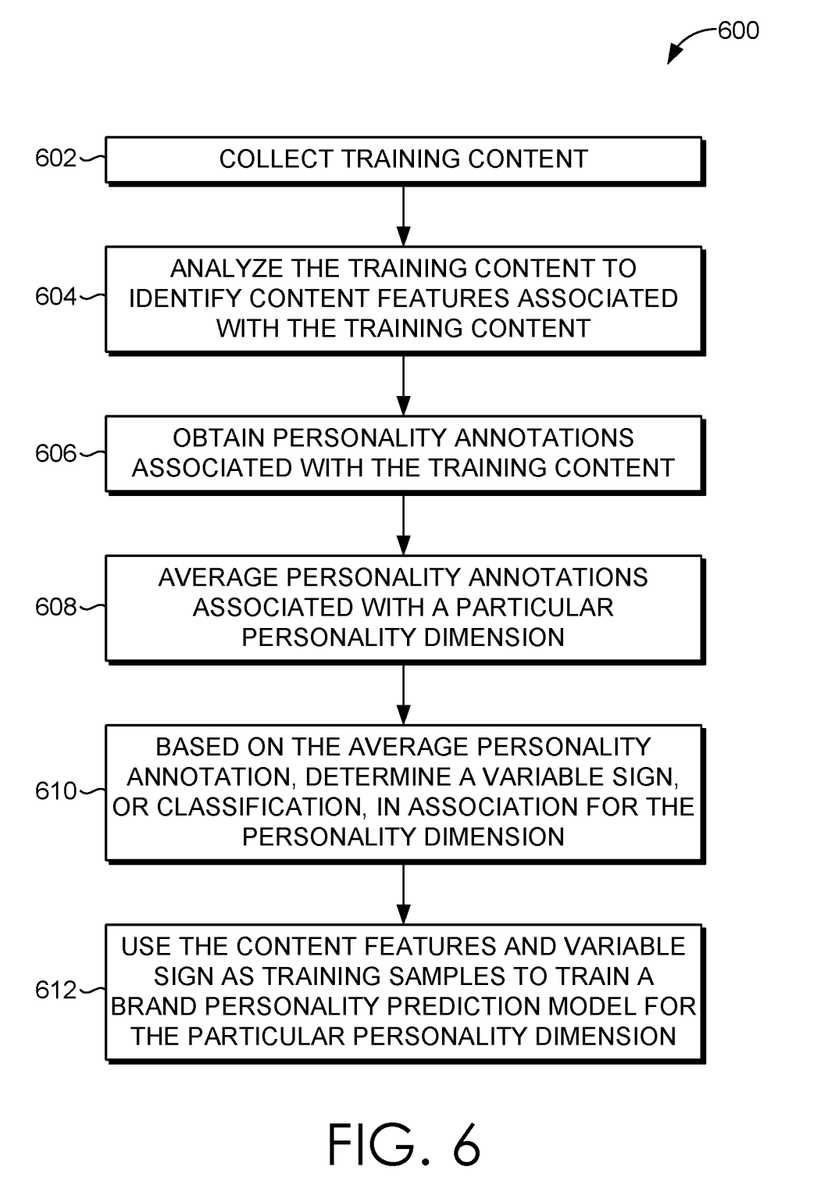
FIG. 6 is a flow diagram showing a method for generating brand personality prediction models, in accordance with an embodiment of the present invention.

Referring now to FIG. 6, a flow diagram shows a method 600 for generating brand personality prediction models, in accordance with embodiments of the present invention. Initially, at block 602, training content is collected. Training content can be any type of content that can be used to train a brand personality prediction model. At block 604, the training content is analyzed to identify content features associated with the training content. At block 606, personality annotations associated with the training content are obtained. Personality annotations associated with a particular personality dimension are averaged, as indicated at block 608. Based on the average personality annotation, a variable sign, or classification, is determined in association for the personality dimension. This is indicated at block 610. The content features and variable sign are used as a training samples to train a brand personality prediction model for the particular personality dimension, as indicated at block 612.

Figure 7:
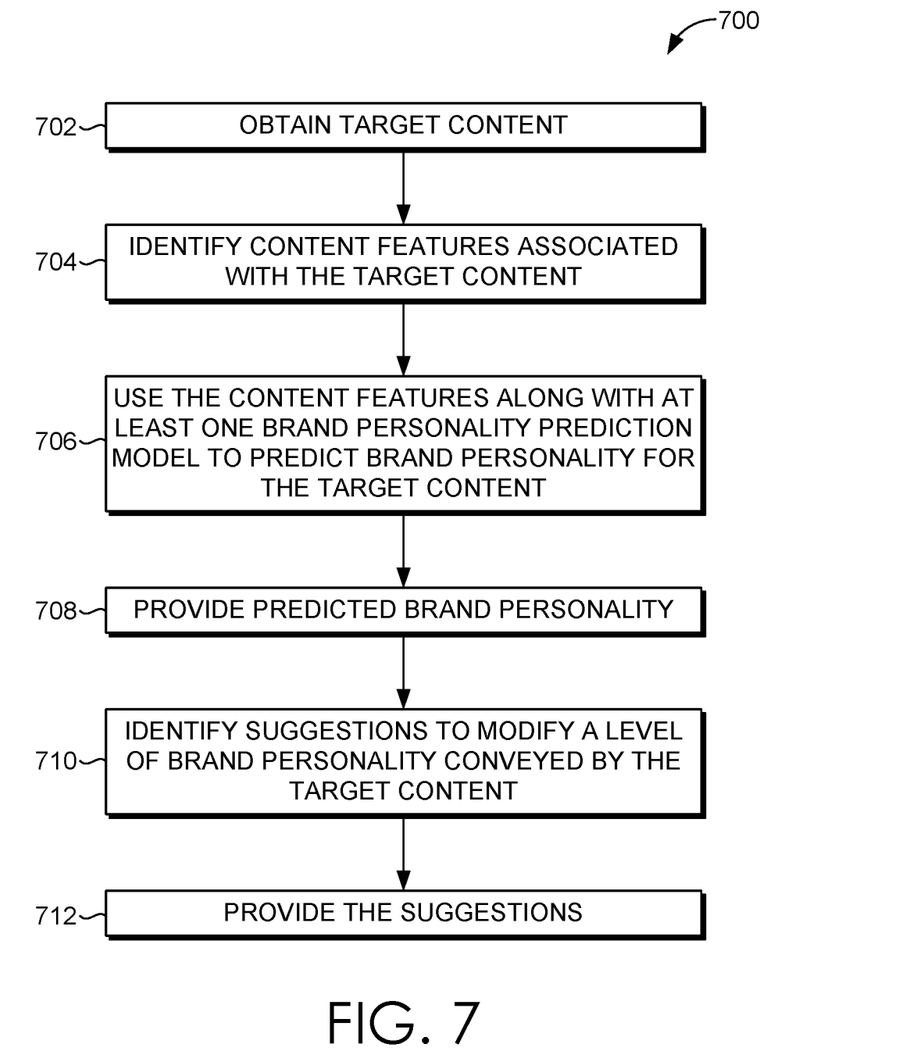
FIG. 7 is a flow diagram showing a method for predicting brand personalities, in accordance with an embodiment of the present invention.

With reference now to FIG. 7, a flow diagram shows a method 700 for prediction brand personality associated with content, in accordance with embodiments of the present invention. At block 702, target content is obtained. Target content can be provided by a user. Thereafter, at block 704, content features associated with the target content are identified. Content features may include any number of features associated with or indicating the content. Content features may include, for example, term features, affect features, and/or linguistic features. At block 706, the content features are used along with at least one brand personality prediction model to predict brand personality for the target content. In some embodiments, each brand personality prediction model predicts a specific brand personality. At block 708, predicted brand personality is provided, for example, to a user requesting brand personality predictions. At block 710, suggestions to modify a level of brand personality conveyed by the target content are identified. For example, suggestions to modify the content to increase or decrease a particular brand personality may be identified. At block 712, the suggestions are provided, for example, to a user requesting to view content modification suggestions.

Figure 8:
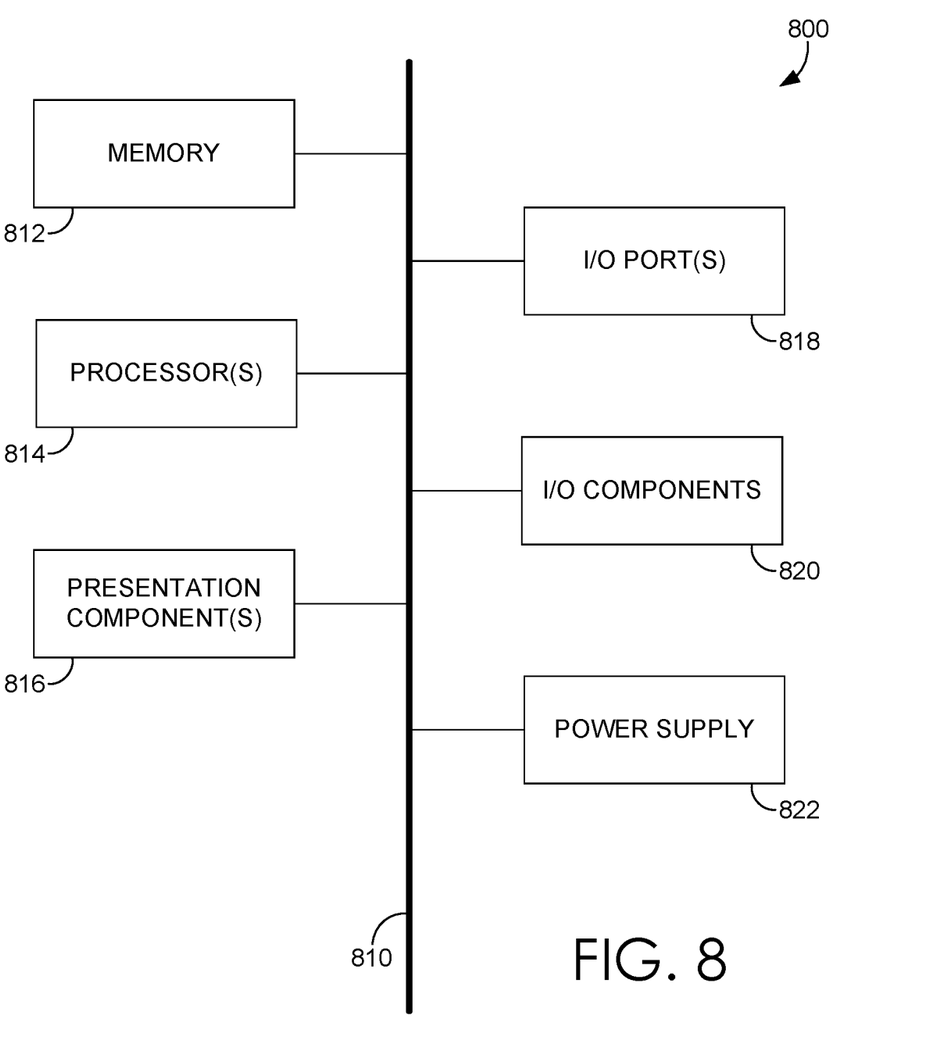
FIG. 8 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output (I/O) ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 900 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
    obtaining target content for which brand personality prediction is desired;
    converting the text of the target content into a sequence of tokens by passing the text through a tokenizer;
    tagging each token with a part of speech tag using a part of speech tagger; identifying content features associated with the target content by analyzing the part-of-speech label of each classified word and analyzing at least one of term features, affect-based features, or linguistic features indicative of at least one aspect of content text, wherein the term features are identified by transforming text from the target content into a set of n-grams, the affect-based features are identified by a Linguistic Inquiry and Word Count (LWIC), and the linguistic features are identified by counting occurrences of the linguistic elements;
    using the content features and a brand personality prediction model to predict a brand personality of the target content is a document prepared with a desired targeted personality for a brand; and
    providing, for display via a graphical user interface, content modification suggestions that indicate suggestions of how to modify an amount of personality conveyed by the target content for a personality dimension of the predicted brand personality of the target content.

2. The one or more computer storage media of claim 1, wherein the target content is provided by an entity publishing the target content.

3. The one or more computer storage media of claim 1, further comprising:
    obtaining personality annotations associated with training content, the personality annotations provided by human annotators; and
    training the brand personality prediction model based on the content features and the personality annotations, the brand personality prediction model configured to predict an extent of a brand personality in association with new content.

4. The one or more computer storage media of claim 1, wherein the brand personality comprises sincerity, sophistication, excitement, competence, or ruggedness.

5. The one or more computer storage media of claim 1 further comprising providing an indication of the predicted brand personality to a provider of the target content.

6. The one or more computer storage media of claim 1, wherein the personality dimension is a selected desired personality for a brand.

7. The one or more computer storage media of claim 1, wherein the request comprises an indication to increase or decrease the level of the predicted brand personality of the target content.

8. The one or more computer storage media of claim 6, wherein the selected desired personality for the brand is one or more of sincerity, sophistication, excitement, competence, or ruggedness.

9. The one or more computer storage media of claim 1 further comprising using a second brand personality prediction model to predict a second brand personality of the target content.

10. The one or more computer storage media of claim 1, further comprising training the brand personality prediction model using content features identified in association with training content and corresponding personality annotations.

11. A computerized method to facilitate brand personality prediction, the method comprising:
    collecting training content using a crawler;
    converting text of the training content into a plurality of tokens by passing the text through a tokenizer;
    classifying each word of the converted text into a part-of-speech label using a part-of-speech tagger;
    identifying content features associated with the training content by analyzing the part-of-speech label of each classified word and analyzing at least one of term features, affect-based features, or linguistic features indicative of at least one aspect of content text, wherein the term features are identified by transforming text from the target content into a set of n-grams, the affect-based features are identified by a Linguistic Inquiry and Word Count (LWIC), and the linguistic features are identified by counting occurrences of the linguistic elements;
    obtaining personality annotations associated with the training content, the personality annotations provided by human annotators; and training a brand personality prediction model based on the content features and the personality annotations, the brand personality prediction model configured to predict an extent of a brand personality in association with a new content.

12. The method of claim 11, wherein the brand personality comprises one of sophistication, competence, ruggedness, excitement, or sincerity.

13. The method of claim 11, wherein the training content comprises a plurality of online electronic documents.

14. The method of claim 11, wherein the new content is a document prepared with a desired targeted personality for a brand.

15. The method of claim 11, wherein the personality annotations comprise personality scores provided by the human annotators that indicate a measure of personality evoked by the training content.

16. The method of claim 11, further comprising using the brand personality prediction model to predict the extent of the brand personality in association with the new content.

17. A computer system comprising:
one or more hardware processors; and
one or more hardware computer storage media storing computer-useable instructions that, when used by the one or more processors, cause the one or more processors to execute:
a model generating means configured to generate at least one brand personality prediction model using training content, collected by a web crawler, and corresponding personality annotations and identify content features associated with the training content, wherein the content features associated with the training content are identified by analyzing at least one of term features, affect-based features, or linguistic features indicative of at least one aspect of content text, wherein the term features are identified by transforming text from the target content into a set of n-grams, the affect-based features are identified by a Linguistic Inquiry and Word Count (LWIC), and the linguistic features are identified by counting occurrences of the linguistic elements;
a brand personality prediction means configured to predict brand personality for content using the at least one brand personality prediction model; and
a content modification means configured to:
determine one or more content modification suggestions to modify the level of the predicted brand personality of the content; and
modify the level of the predicted brand personality of the content based on a selection of the one or more content modification suggestions.

18. The system of claim 17, wherein the content is a document prepared with a desired targeted personality for a brand.

19. The system of claim 17, wherein the personality annotations are provided by annotators indicating an extent of personality evoked by the training content.

20. The system of claim 17, wherein the brand personality prediction means is further configured to identify the content features associated with the content, and using the identified content features along with the at least one brand personality prediction model to predict brand personality for the content.

* * * * *